(12) United States Patent
Latham

(10) Patent No.: US 6,186,760 B1
(45) Date of Patent: *Feb. 13, 2001

(54) BLOW MOLD MACHINE MONITOR AND CONTROL SYSTEM

(76) Inventor: Greig S. Latham, 5 Lime Cove, Lucas, TX (US) 75002

( * ) Notice: Under 35 U.S.C. 154(b), the term of this patent shall be extended for 0 days.

This patent is subject to a terminal disclaimer.

(21) Appl. No.: 09/241,250

(22) Filed: Feb. 1, 1999

Related U.S. Application Data

(63) Continuation-in-part of application No. 08/905,070, filed on Aug. 1, 1997, now Pat. No. 5,866,175.

(51) Int. Cl.[7] .............................. B29C 49/36; B29C 49/78
(52) U.S. Cl. ......................... 425/149; 425/150; 425/170; 425/171; 425/529; 425/540
(58) Field of Search .................................. 425/170, 171, 425/529, 533, 540, 149, 150

(56) References Cited

U.S. PATENT DOCUMENTS

| | | |
|---|---|---|
| 3,097,398 | 7/1963 | Iglesby ................. 425/170 |
| 3,737,275 | 6/1973 | Kontz ................... 425/536 |
| 3,752,627 | 8/1973 | Bourgeois et al. ........ 425/298 |
| 4,021,517 | 5/1977 | Schmidt et al. .......... 264/528 |
| 4,325,897 * | 4/1982 | Zerle et al. ............ 425/140 |
| 4,372,735 | 2/1983 | Collette ................ 425/135 |
| 4,826,418 | 5/1989 | Kamiguchi .............. 425/136 |
| 5,169,705 | 12/1992 | Coxhead et al. ......... 425/150 |
| 5,244,610 | 9/1993 | Kitzmiller ............. 264/40.1 |
| 5,269,672 | 12/1993 | DiGangi, Jr. ........... 425/150 |
| 5,322,651 | 6/1994 | Emmer ................. 425/526 |
| 5,470,218 | 11/1995 | Hillman et al. .......... 425/144 |
| 5,572,816 | 11/1996 | Anderson, Jr. et al. ..... 40/505 |
| 5,626,804 * | 5/1997 | Benkowski et al. ....... 425/150 |
| 5,866,175 | 2/1999 | Latham ................. 425/170 |

* cited by examiner

Primary Examiner—Robert Davis
(74) Attorney, Agent, or Firm—Locke Liddell & Sapp LLP

(57) ABSTRACT

A system for monitoring a stretch blow mold machine includes devices for monitoring the position of a stretch rod with respect to a mold, an air pressure sensor for monitoring air pressure introduced through the stretch rod, and a sensor for monitoring temperature of fluid within a fluid cavity for chilling the mold. The system includes a display for monitoring position data, pressure data, and temperature data generated by the respective sensors.

20 Claims, 2 Drawing Sheets

BLOW MOLD MACHINE MONITOR AND CONTROL SYSTEM

RELATED APPLICATION

This application is a continuation-in-part of U.S. application Ser. No. 08/905,070 filed Aug. 1, 1997, and entitled "Stretch Blow Molding Machine Monitoring System" and now U.S. Pat. No. 5,866,175.

TECHNICAL FIELD OF THE INVENTION

The present invention relates to blow mold machines, and more particularly to a system for monitoring and controlling workstation parameters.

BACKGROUND OF THE INVENTION

Hollow, plastic containers are typically manufactured using a blow mold machine. In general, there are two types of machines: a two-stage, reheat, stretch blow mold machine and a one-stage blow mold machine. Typically a stretch blow mold machine consumes a plastic preform created utilizing an extruder, in an injection-molding operation. Alternatively, a one-stage blow mold machine uses a parison formed by an extruder in a more continuous process. That is to say the preform is injection molded and can be warehoused, whereas the parison is formed just before it is blown.

Functionally, the one-stage blow mold machine differs from the following discussion of two-stage machines in that the parison is typically formed just before it is transformed into the container and there is no stretch rod. On two-stage or reheat-stretch machines, the preforms are conveyed to the stretch blow mold machine and often times inspected by automated visual scanners to detect irregularities. Any preforms failing to meet preprogrammed criterion are rejected before being loaded into the stretch blow mold machine. In general, the first step of the stretch blow mold process is to reheat the preform in an oven upstream from the stretch blow mold machine rotary table. The preforms are heated as they are conveyed through the oven. Typically, the heated preform is transferred to the rotary stretch blow mold machine at the load station. The load station includes rotating arms that grasp the preform and place the preform in the two-piece mold cavity. The load station is synchronized with the stretch blow mold machine wheel and the mold closes around the preform after the preform is loaded.

As the wheel continues to rotate, the stretch rod is driven down through the neck of the preform. When the stretch rod is moving down, low-pressure air (typically 150 psi) is introduced into the preform via the hollow stretch rod to prevent the preform from collapsing on the stretch rod. Some time after the stretch rod reaches its maximum extension or stroke, high pressure blow air (typically 600 psi) is applied to the inside of the preform to force the heated plastic against the mold surrounding the preform. It is understood that the container may be formed by any fluid, not only air. The mold is typically cooled by chilled process water circulated in the jacketed mold. The high-pressure blow air is applied to the now formed container for a portion of the wheel's revolution to allow the container to cool.

After the cooling interval, the center rod retracts and the blow air is exhausted. The stretch rod retracts to the fully retracted position before the mold opens to expose the container for extraction. The extraction or unload station is synchronized to the stretch blow mold machine wheel and transfers the container from the wheel to the exit conveyor. The exit conveyor transports the container to an approval inspection station and then on to a palletizer.

Stretch blow mold machines are available in many configurations ranging from two stations to 40 or more stations. Previously, there has been no way to monitor specific process parameters at the individual stations used to produce a container. Previous systems were only able to monitor process parameters as they related to all stations on a wheel. Blow air pressure and water values could only be determined at the manifold level. There was no method to monitor the displacement of the stretch rod. Station molds, stretch rods, valves, seals, cams, ports, orifices, and other unique components wear at different rates, are subject to different alignment errors during normal operation, mold changes and routine maintenance activities. These differences affect the quality of containers produced. Significant station-to-station differences are difficult or impossible to detect during continuous production. Quality problems are detected only during random quality control samples. If a bad container is found during this quality check, it is impossible to determine how many out of specification containers have been produced.

A stretch blow mold machine may produce as many as 40,000 or more containers per hour. The wheel is totally enclosed by safety walls and doors. The high angular velocities make it difficult to visually observe station actions without the use of a strobe light. Very small process changes negatively affect the quality of the container. Most of these process changes are not detectable external to the machine. Even if slip rings were employed to provide power to the wheel, communicating across these rings severely limits the data throughput due to the high noise margin induced by slip ring brushes.

Rotating platforms for container formations create an unusually difficult environment to monitor and control the process. This environment not only challenges existing control methods; but, makes it impossible to communicate large volumes of high-resolution data necessary to visualize and control the process.

A need has thus arisen for a system for monitoring and controlling workstation parameters of a blow mold machine.

SUMMARY OF THE INVENTION

The present invention allows for the monitoring of critical blow mold parameters to determine in real time, during continuous process operations which workstations are producing out of specification containers and effect closed loop controls used to fabricate the container. Transducers continuously monitor the process parameters. The controller senses the speed of the stretch blow mold machine and dynamically changes the interrupt interval to ensure the transducer sampling is synchronized to the angular velocity of the wheel. Closed-loop feedback control is made possible by modifying outputs used to control servovalves, servocylinders, servomotors, and other continuous control devices. The controller is able to process the data and detect an out of tolerance condition. Such out of tolerance product is either rejected from the machine by wheel mounted devices or a coded signal is transmitted to the machine controller to reject the product from the discharge stream. A profile of the process control parameters is transmitted to a computer to create graphs and selected indices for detailed analysis. Key data is also trended in graphical and tabular form for historical and statistical analysis purposes.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
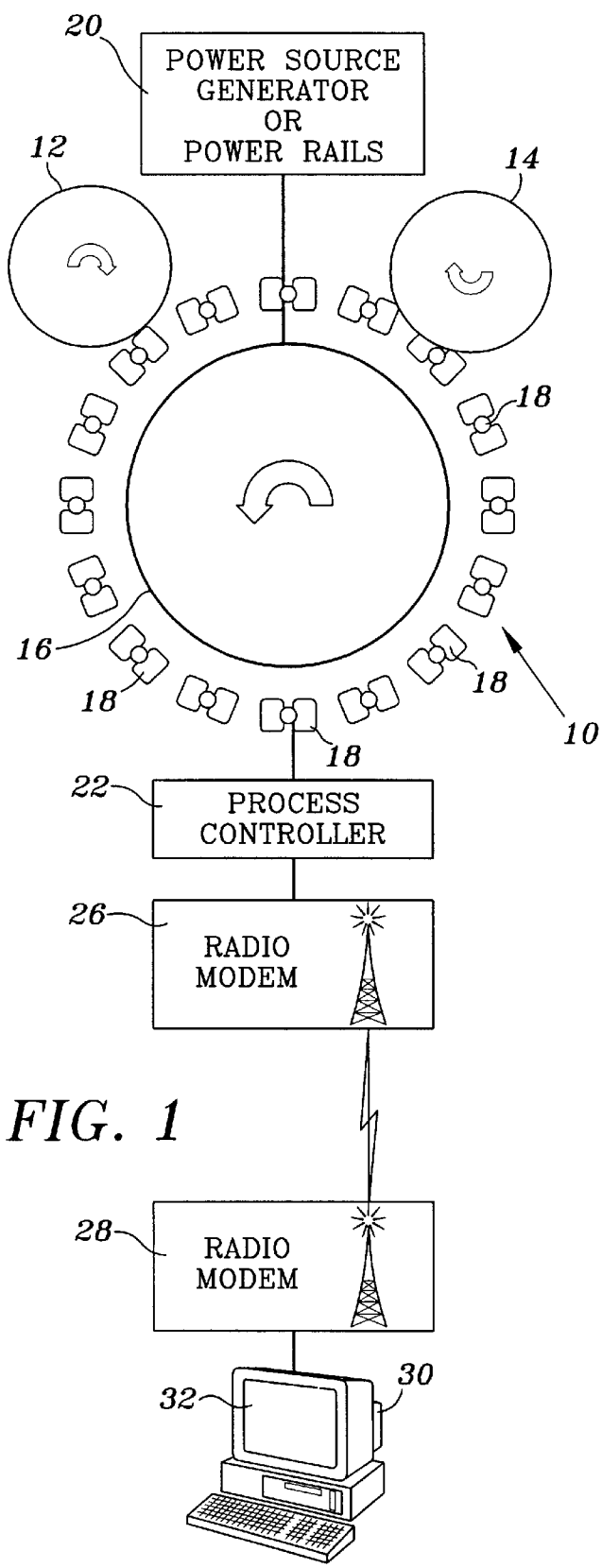
FIG. 1 is a schematic block diagram of a stretch blow mold machine illustrating the present invention.

Referring to FIG. 1, a block diagram of an exemplary stretch blow mold machine is illustrated, and is generally identified by the numeral 10. Stretch blow mold machine 10 includes a load station 12, an unload station 14, a wheel 16, and a plurality of workstations 18.

Load station 12 moves plastic preforms from an upstream oven onto stretch blow mold machine 10. Load station 12 is synchronized with the rotation of stretch blow mold machine wheel 16 so as to move the preforms effectively, regardless of the running speed of machine 10. Machine 10 includes blow-molding workstations 18 mounted around the periphery of wheel 16. Workstations 18 will be further described with respect to FIG. 2.

Machine 10 is powered from a power source 20 including a permanent magnet dc motor and a dc-to-dc converter or power rails fitted to the machine 10.

Data acquired from the plurality of workstations 18 is collected and processed by a process controller 22. Controller 22 transmits data from a display buffer to a radio modem 26. Radio modem 26 is mounted on machine 10 and communicates with a second radio modem 28. Radio modem 28 is stationary and is located at a remote site for communication of data to a computer 30 having a display 32. Computer 30 and display 32 display graphic representation of data collected by controller 22.

Figure 2:
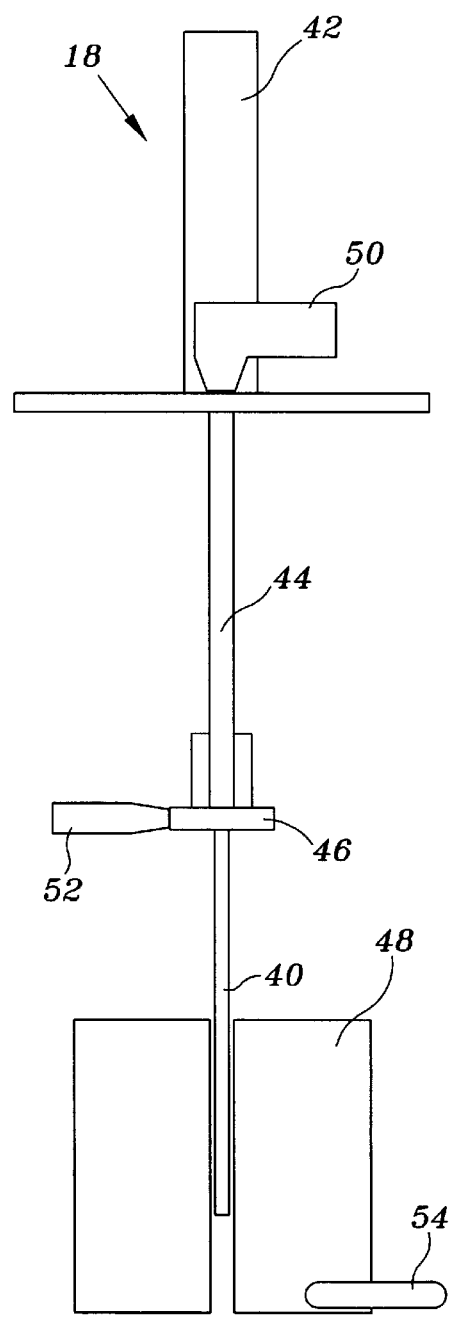
FIG. 2 is a schematic diagram illustrating a workstation of a stretch blow mold machine in accordance with the present invention.

Referring to FIG. 2, a workstation 18 is illustrated in block diagram form. Workstation 18 includes a stretch rod 40. A stretch rod air cylinder 42 causes a stretch rod actuator 44 to move up and down. Stretch rod actuator 44 is connected to a station yoke 46. Yoke 46 moves along two parallel rails (not shown) to ensure that stretch rod 40 moves in a straight line. Stretch rod 40 is also attached to stretch rod yoke 46. Stretch rod 40 moves in and out of a mold cavity 48. An important aspect of the present invention is the use of a stretch rod displacement transducer 50 to monitor the position of stretch rod yoke 46. Stretch rod displacement transducer 50 may include, for example, an ultrasonic, piezoelectric device. Such a device may comprise, for example, an ultrasonic Pulsonic Model 5000 CP piezoelectric sensor manufactured and sold by Cleveland Motion Controls, an IMC Company. Transducer 50 may also include an acoustic reflector (not shown) mounted on stretch rod yoke 46 to facilitate the return of acoustic energy to transducer 50 in order to determine stretch rod 40 displacement. Transducer 50 may also include a photoelectric device, a laser device, string potentiometer, encoder or any variation of a linear voltage displacement transducer.

Blow air is introduced to stretch rod 40 by a fitting (not shown) also mounted on yoke 46. A blow air pressure transducer 52 is connected to a blow air fitting (not shown) to allow the determination of blow air pressure in accordance with the present invention. Transducer 52 may comprise for example, a model MSP 400 manufactured and sold by Measurement Specialties, Inc. Additionally, in accordance with the present invention, a pressure transducer with an integral thermocouple may determine the blow air temperature; such an integrated transducer is a Model MSP-310 manufactured and sold by Measurement Specialties, Inc. A separately mounted thermocouple might also be used.

Mold cavity 48 is temperature controlled utilizing chilled water. The temperature of the chilled water is sensed by a thermal sensor 54, such as for example, a thermocouple, resistance temperature detector or thermistor.

Transducers 50 and 52, and temperature sensor 54 provide output to process controller 22 which transmits data to modem 26. Modem 26 may comprise, for example, a 2.4 GHz model 0110 Access Point configured as a spread spectrum industrial radio modem manufactured and sold by Intermec. Modem 28 may comprise, for example, a 2.4 GHz model 2100 Universal Access Point manufactured and sold by Intermec.

Figure 3:
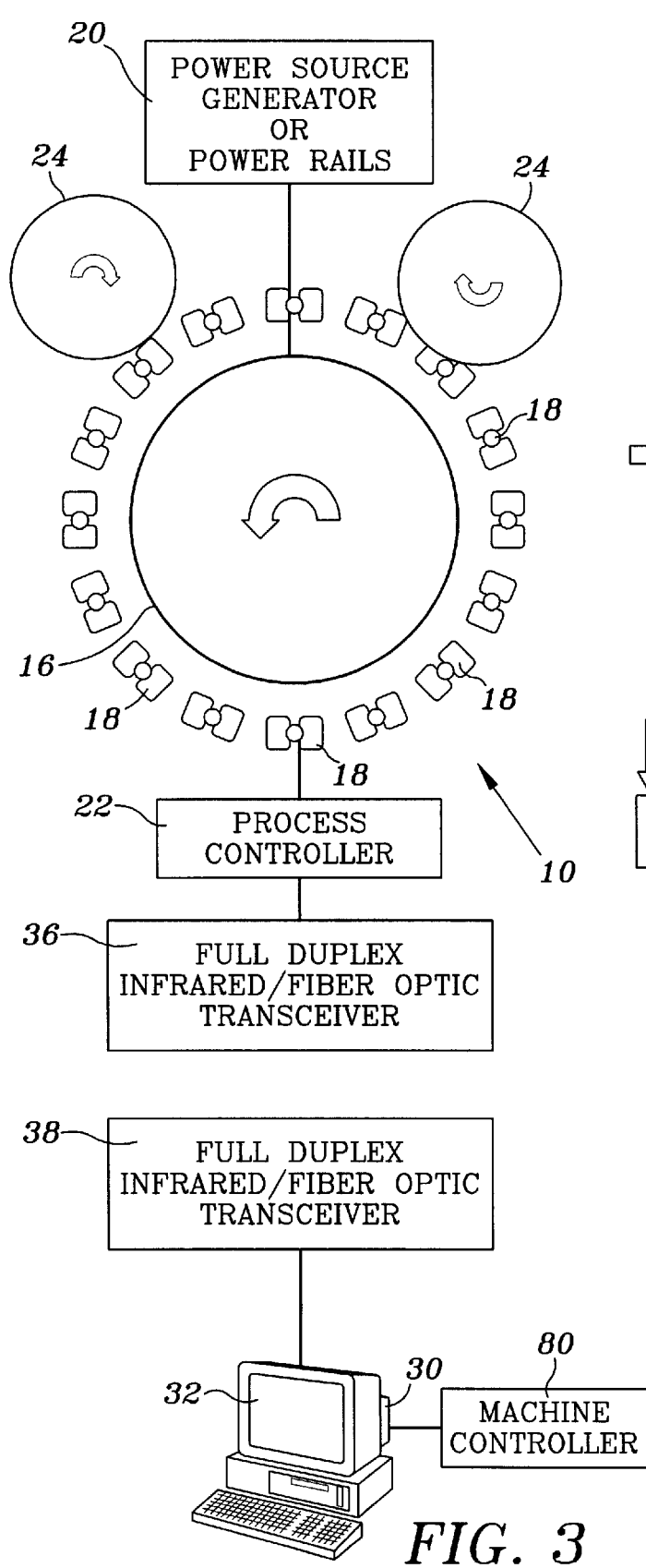
FIG. 3 is a schematic block diagram of a stretch blow mold machine illustrating the present invention using infrared and fiber optic communications.

Referring to FIG. 3, load station 12 (FIG. 1) is replaced by effectors 24 located on the blow mold machine wheel 16 and controlled by the process controller 22. The effectors 24 eliminate the need for the mechanically timed load station apparatus to move the preform from the reheat oven to the blow wheel. Additionally, unload station 14 (FIG. 1) is replaced by effectors 24 located on the blow mold machine wheel 16 and controlled by the process controller 22. The effectors 24 eliminate the need for the mechanically timed unload station apparatus to move the preform from the reheat oven to the blow wheel. Controller 22 transmits data to a rotating infrared or fiber optic transceiver 36 mounted on the wheel 16 used to communicate with a stationary infrared or fiber optic transceiver 38 mounted off the rotation portion of the blow mold machine and connected to the computer 30. The present invention involves rejecting formed containers from the discharge product stream by operating a device such as a solenoid located near the unload station 14 or by using the unload effectors 24. A coded signal relating the station to be rejected may also be sent from the computer 30 to the blow machine controller 80. Computer 30 executes several algorithms designed to analyze, store, visualize and serve the production/process data to other consumers.

Figure 4:
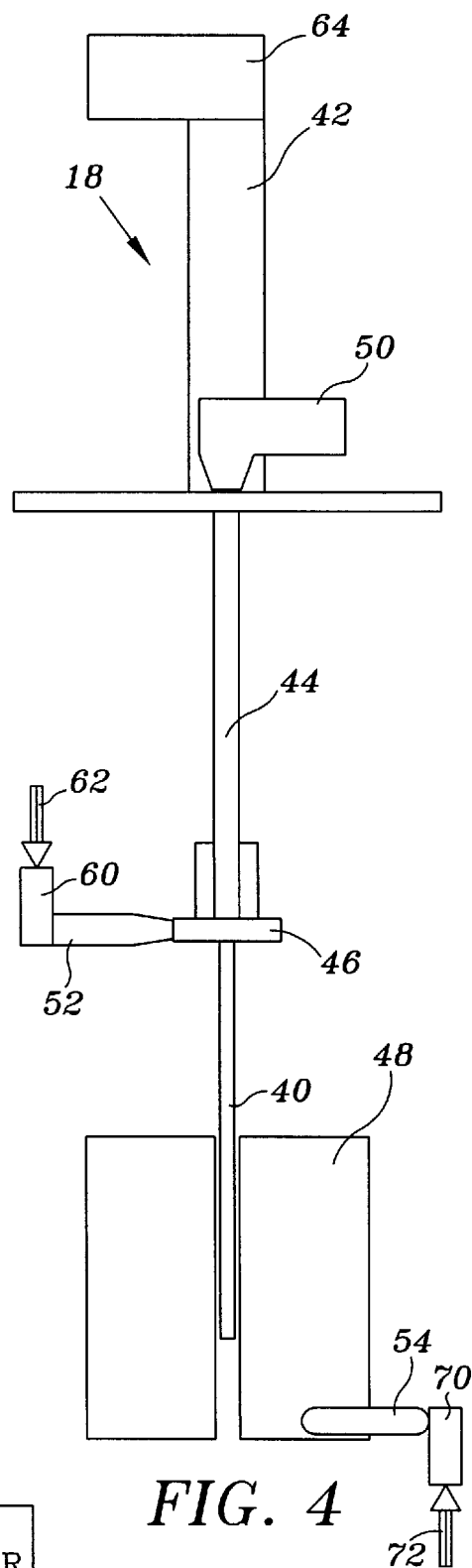
FIG. 4 is a schematic diagram illustrating a workstation of a stretch blow mold machine with output devices used for closed-loop control in accordance with the present invention.

Referring to FIG. 4, the displacement of the stretch rod 40 is controlled by servovalve 64. Output modules contained in the process controller 22 control servovalve 64. Process controller 22 executes a closed-loop, feedback control algorithm to precisely alter the relative timing and absolute positioning of the stretch rod 40. The function of servovalve 64 may also be performed by a servocylinder or servomotor. Blow air or blow fluid flow and pressure is controlled by a servovalve 60. Output modules contained in the process controller 22 control servovalve 60. Process controller 22 executes a closed-loop, feedback control algorithm to precisely alter the relative timing and absolute flow and pressure of blow air. A servovalve 62 controls the blow air or fluid temperature. Output modules contained in the process controller 22 control servovalve 62. Process controller 22 executes a closed-loop, feedback control algorithm to precisely mix the hot and cold blow air supplies to precisely control the blow air temperature. Mold chilling fluid or water flow is controlled by a servovalve 70. Output modules contained in the process controller 22 control servovalve 70. Process controller 22 executes a closed-loop, feedback control algorithm to precisely alter the flow and pressure of mold water. A servovalve 72 controls the mold temperature. Output modules contained in the process controller 22 control servovalve 72. Process controller 22 executes a closed-loop, feedback control algorithm to precisely mix the hot and cold mold water supplies to precisely control the mold temperature.

Power source 20 may include a series of stackable or molded power rails mounted on a stationary portion of machine 10. Pick-up shoes ride along the rails. Additionally, a slip ring can be attached to wheel 16. The slip ring is constructed such that brushes mounted on the fixed or stationary part of machine 10 contact the slip ring. The slip ring turns past the fixed brush, which is fabricated of electrically conductive material. With the slip ring and brush combination there is an electrical circuit completed to the rotating portion of machine 10.

Additionally, power source 20 may include dc generator and dc-to-dc converter. The dc generator is geared to a ring installed on the machine 10. As the machine 10 drum begins to turn, the generator produces electricity. The output of the generator is regulated and filtered by a dc-to-dc converter. The generator stage of power source 20 utilizes a permanent magnet gear motor driven as a generator and, power is generated through magnetic induction or electrostatic coupling. This arrangement produces direct current with no battery being required on wheel 16.

In general, a minimal system configuration monitors the blow pressure. The process requirements, age of the blow machine, condition of the blow machine, availability of ancillary devices among other considerations determine how many more process parameters should be monitored. Demanding applications requires the control of one or more process parameters as described above.

It therefore can be seen that the present invention provides for monitoring in real time, critical blow mold machine parameters, controlling these parameters, visualizing heretofore hidden effects and archiving process data for statistical process control use.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. In a stretch blow mold machine including a rotating wheel having a plurality of workstations, each workstation having a mold cavity, a stretch rod mounted for movement with respect to the mold cavity and through which pressurized air is introduced into the mold cavity, and a fluid cavity containing fluid for chilling the mold cavity, a system for monitoring each workstation comprising:
   means mounted to the workstation for monitoring the position of the stretch rod with respect to the mold cavity and for generating position data;
   means disposed at each workstation for monitoring air pressure introduced through the stretch rod and for generating pressure data;
   means disposed at each work station for monitoring temperature of the fluid in the fluid cavity and for generating temperature data;
   means for displaying said position data, pressure data, and temperature data; and
   an infrared communications link for continuously transmitting said data in real time from said monitoring means to said display means.

2. The system of claim 1 and further including a power source for generating power based upon rotation of the rotating wheel of the stretch blow mold machine.

3. The system of claim 1 and further including a power source for generating power based upon magnetic induction.

4. The system of claim 1 and further including a power source for generating power based upon electrostatic coupling.

5. In a blow molding machine including a rotating wheel having a plurality of workstations, each workstation having a mold cavity through which pressurized fluid is introduced into the mold cavity, and a fluid cavity containing fluid for chilling the mold cavity, a system for monitoring each workstation comprising:
   means disposed at each work station for monitoring fluid pressure introduced through the mold cavity and for generating pressure data;
   means for displaying said pressure data; and
   a radio modem for continuously transmitting said data in real time from said monitoring means to said display means.

6. The system of claim 5 and further including means for controlling air pressure based upon said pressure data.

7. In a stretch blow molding machine including a rotating wheel having a plurality of workstations, each workstation having a mold cavity, a stretch rod mounted for movement with respect to the mold cavity and through which pressurized air is introduced into the mold cavity, and a fluid cavity containing fluid for chilling the mold cavity, a system for monitoring each workstation comprising:
   means mounted to the workstation for monitoring the position of the stretch rod with respect to the mold cavity and for generating position data;
   means disposed at each workstation for monitoring air pressure introduced through the stretch rod and for generating pressure data;
   means for displaying said position data and pressure data; and
   a radio modem for continuously transmitting said data in real time from said monitoring means to said display means.

8. The system of claim 7 and further including a power source for generating power based upon rotation of the rotating wheel of the stretch blow molding machine.

9. The system of claim 7 and further including a power source for generating power based upon magnetic induction.

10. The system of claim 7 and further including a power source for generating power based upon electrostatic coupling.

11. The system of claim 7 and further including:
    means for controlling air pressure and position of said stretch rod based upon said data.

12. In a stretch blow molding machine including a rotating wheel having a plurality of workstations, each workstation having a mold cavity, a stretch rod mounted for movement with respect to the mold cavity and through which pressurized air is introduced into the mold cavity, and a fluid cavity containing fluid for chilling the mold cavity, a system for monitoring each workstation comprising:
    means mounted to the workstation for monitoring the position of the stretch rod with respect to the mold cavity and for generating position data;
    means disposed at each workstation for monitoring air pressure introduced through the stretch rod and for generating pressure data;

means for displaying said position data and pressure data; and an infrared communications link for continuously transmitting said data in real time from said monitoring means to said display means.

13. The system of claim 12 and further including a power source for generating power based upon rotation of the rotating wheel of the stretch blow molding machine.

14. The system of claim 12 and further including a power source for generating power based upon magnetic induction.

15. The system of claim 12 and further including a power source for generating power based upon electrostatic coupling.

16. In a blow molding machine including a rotating wheel having a plurality of workstations, each workstation having a mold cavity through which pressurized fluid is introduced into the mold cavity, and a fluid cavity containing fluid for chilling the mold cavity, a system for monitoring each workstation comprising:

means disposed at each work station for monitoring fluid pressure introduced through the mold cavity and for generating pressure data;

means for displaying said pressure data; and an infrared communications link for continuously transmitting said data in real time from said monitoring means to said display means.

17. The system of claim 16 and further including means for controlling air pressure based upon said pressure data.

18. The system of claim 16 and further including a power source for generating power based upon the rotating wheel of the stretch blow mold machine.

19. The system of claim 16 and further including a power source for generating power based upon magnetic induction.

20. The system of claim 16 and further including a power source for generating power based upon electrostatic coupling.

* * * * *